Sept. 13, 1932. S. L. GOLDSBOROUGH 1,877,168
PROTECTIVE RELAY SYSTEM
Original Filed June 18, 1930
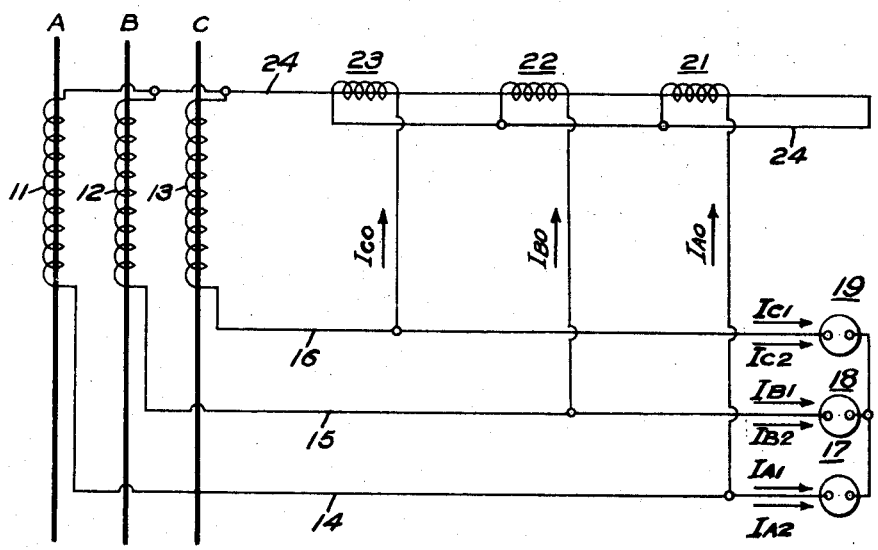
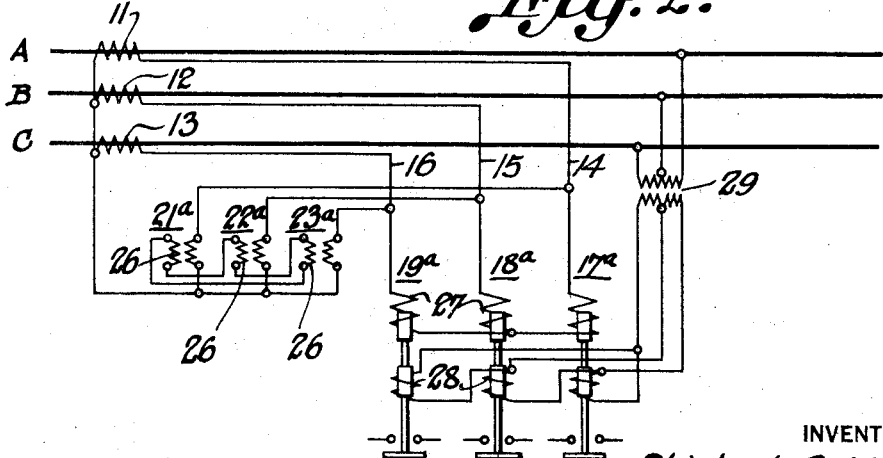
INVENTOR
Shirley L. Goldsborough.
BY
Wesley I. Barr
ATTORNEY Patented Sept. 13, 1932

1,877,168

UNITED STATES PATENT OFFICE

SHIRLEY L. GOLDSBOROUGH, OF EAST ORANGE, NEW JERSEY, ASSIGNOR TO WESTINGHOUSE ELECTRIC & MANUFACTURING COMPANY, A CORPORATION OF PENNSYLVANIA

PROTECTIVE RELAY SYSTEM

Application filed June 18, 1930, Serial No. 462,052. Renewed January 13, 1932.

This application is a continuation in part of, and substitute for, my application Serial No. 406,828, filed November 13, 1929.

My invention relates to protective systems for power lines and electric circuits and more particularly to protective systems involving the utilization of symmetrical coordinates or phase-sequence quantities.

It is an object of the present invention to provide a relay protective system, operable in accordance with the magnitudes and relations of phase-sequence quantities on an alternating-current circuit to be protected, which obviates certain disadvantages and defects encountered in the operation of protective systems of usual types dependent, in their operation, on the magnitude of the current or voltage of the circuit or functions of the current and voltage, either separately or in combination.

A further object of the present invention is to provide a protective system for a polyphase circuit whereby the effects of fault conditions, such as phase-to-phase short-circuits or phase-to-ground faults, may be resolved into phase-sequence quantities, and simple, but adequate, protection for the polyphase circuit may be afforded.

As a preliminary consideration, and in order to facilitate the comprehension of the present invention, the following points are noted; it being understood that, although the conditions occurring in a three-phase system are specifically analyzed, the principles of my invention are applicable to polyphase circuits generally.

In any three-phase system, the currents traversing the respective phases A, B and C may be designated as $I_A$, $I_B$, and $I_C$, and this set of currents may be obtained by adding the following sets of currents. In each phase is a zero-phase-sequence current $I_{A0}$, and these three currents are all equal and in phase. In the case of a star-connected system, the sum of these three currents results in a current $3 I_{A0}$ in the neutral. There is also a positive-phase-sequence current $I_{A1}$ in phase A, a corresponding current $a^2 I_{A1}$ in phase B, and a corresponding current $a I_{A1}$ in phase C, where $$a = \sqrt{-1} = 1/2 + 1/2\sqrt{-3}.$$

A third set of currents is also present, viz., a negative-phase-sequence current $I_{A2}$ in phase A, a corresponding current $a I_{A2}$ in phase B and a corresponding current $a^2 I_{A2}$ in phase C.

The above three sets of currents are known as the zero-sequence, positive-sequence and negative-sequence, respectively, wherein the operator "a" signifies the rotation of a vector through an angle of 120 degrees in the positive or phase-advancing direction, $a^2$ signifies 240 degrees of rotation and $a^3$ 360 degrees, or $$a = -1/2 + j\, 1/2\sqrt{3} = \epsilon j\, 120° = -0.5 + j0.866$$

$$a^2 = -1/2 - j\, 1/2\sqrt{3} = \epsilon j\, 240° = -0.5 + j0.866,$$

and $$a^3 = 1 = \epsilon j\, 360° = \epsilon j 0° = 1.0 + j0.0,$$

where $\epsilon = 2.7183 =$ base of natural logarithms, and $j = \sqrt{-1}$.

From the above determined relations, remembering $1 + a + a^2 = 0$, I may express the symmetrical phase-sequence components in terms of the line currents $I_A$, $I_B$ and $I_C$ in the three conductors.

Thus, $$(1)\ I_{A0} = \frac{I_A + I_B + I_C}{3}$$

$$(2)\ I_{A1} = \frac{I_A + a I_B + a^2 I_C}{3}$$

and $$(3)\ I_{A2} = \frac{I_A + a^2 I_B + a I_C}{3}.$$

Similarly, $$(4)\ I_A = I_{A0} + I_{A1} + I_{A2}$$

$$(5)\ I_B = I_{A0} + a^2 I_{A1} + a I_{A2}$$

and $$(6)\ I_C = I_{A0} + a I_{A1} + a^2 I_{A2}.$$

From the foregoing analysis, it may readily be observed that any three vectors, such as $I_A$, $I_B$ and $I_C$, may be resolved into three sets of symmetrical components, one consisting of three vectors which are equal and in phase, or zero-sequence components, and the other two sets consisting of balanced three-phase vectors which are referred to as the positive-sequence and negative-sequence components, respectively.

In the event of a fault occurring on a power system, the several phase-sequence components of current will be present in definite amounts which vary with the nature of the fault and the positive, negative and zero phase-sequence impedances of the system. For example, in a three-phase short-circuit, there is no ground current and, since the three currents are equal and 120° apart, the negative and zero phase-sequence components are zero; the positive-sequence components being the total resulting current.

In a single-phase line-to-line fault, the zero-sequence current is zero because there are no ground connections, and only the positive-sequence and negative-sequence components result. These two current-components $I_{A1}$ and $I_{A2}$ are equal and opposite to each other. The corresponding phase-sequence voltage-components $E_{A1}$ and $E_{A2}$ at the fault are also equal.

In the case of one line being grounded, the zero, positive and negative-sequence current-components form the resulting short-circuit current. These three phase-sequence current-components are equal, while the phase-sequence voltage-components appearing at the fault sum up to zero, (assuming a fault of negligible impedance).

In the event of a double-fault to ground, or when two lines are grounded simultaneously, all of the phase-sequence components of current will result, the total short-circuit current being the sum of the zero, positive and negative sequence components. The various phase-sequence voltages at the fault in this case, are equal.

Because of the different values of current resulting from the above-described short-circuit conditions, it has proven to be quite difficult to provide relay protective means operable for predetermined fault conditions. For example, impedance relays, or relays having a current-responsive actuating coils and voltage-responsive restraining coils, when adjusted for single-phase line-to-line short-circuits will perform in a different manner when a double-fault to ground occurs. It may be shown, by the method of symmetrical co-ordinates, or phase-sequence analysis, that substantial benefits may be obtained, in many cases, by excluding the zero-phase-sequence currents from the relays, and energizing the relays by an artificially produced quantity made up of only the positive and negative phase-sequence current-components.

In accordance with my invention, therefore, and for the purpose of providing current adjustments for protective relays, whereby the degree of energization of such relays will be substantially equal for several fault conditions occurring on a three-phase system, I propose to eliminate the zero sequence components of current from the relays.

In the drawing, Fig. 1 is a schematic diagram illustrating an embodiment of my invention applied to a three-phase circuit, and Fig. 2 is a different diagrammatic representation illustrating an electrical equivalent.

Referring more specifically to the drawing, a three-phase system having the phase conductors thereof designated by A, B and C is adapted to be protected by relay means in the event of fault conditions occurring on the said system. Current transformers are associated with the respective phases of the said system, and the secondaries thereof, 11, 12 and 13, are star-connected.

Conductors 14, 15 and 16, feeding current to any set of current-coils, as for example, three protective relays 17, 18 and 19, are respectively electrically connected between the transformer secondary windings 11, 12 and 13, and the relay terminals, as shown.

The relays 17, 18 and 19 may be any conventional type of protective relay, but my invention is applicable, preferably, to protective systems employing relays of the impedance type. Such relays include a current winding and a voltage winding, and, in view of the extensive use and knowledge thereof by those skilled in the art, it is believed that the schematic showing in the drawing is sufficient. It is pointed out, however, that the drawing discloses merely the connections for the current windings of the relays; it being understood that the potential elements may be energized in accordance with the potentials on the phase conductors A, B and C in a usual, or any desired manner.

Any zero-phase-sequence current-components traversing the main curent transformers 11, 12 and 13 may be filtered out, in accordance with my invention, before the remainder of the current is fed into the relay current-coils 17, 18 and 19. To this end, I provide a grounding transformer, in the case shown in the drawing comprising a set of auxiliary current transformers 21, 22 and 23 having star-connected primary windings which are connected across the main current-transformer conductors 14, 15 and 16, thereby providing a neutral point which is connected, by a conductor 24, to the neutral point of the main current transformers 11, 12 and 13, through the secondaries of the auxiliary transformers 21, 22 and 23, which are thus connected in series with the neutral connection 24. In a three-phase system, as shown, wherein the neutral current is three times the zero-sequence component in each phase-conductor, the auxiliary transformers 21, 22 and 23 will have a three-to-one ratio. The primaries and secondaries of the auxiliary transformers thus have equal ampere-turns and are connected in opposition so as to be substantially non-inductively related.

By my auxiliary transformers, therefore, I provide a by-pass path of extremely low impedance for by-passing the zero-sequence currents from the relays 17, 18 and 19, and returning the same to the neutral of the main current transformers 11, 12 and 13. The polyphase positive and negative sequence currents, however, cannot pass through the auxiliary transformers because of the impedance of their primary windings.

The relays 17, 18 and 19 are, therefore, energized only in accordance with the positive and negative sequence components of the respective phases A, B and C and the path of such current flow is indicated by $I_{A1}$, $I_{A2}$; $I_{B1}$, $I_{B2}$; and $I_{C1}$, $I_{C2}$, respectively.

The above-described method for eliminating the zero-sequence components of current from a relay protective scheme is particularly adapted for high-speed impedance-relay connections, and insures that a predetermined relay setting will result in a relay operation which is substantially the same, at the balance point, or limit of operation of the relay, irrespective of whether there is a double ground fault or a simple line-to-line fault on the system to be protected, and thus it provides a desirable basis for relay action.

According to my invention, it is immaterial how the relay coils are connected, whether in star or delta, or, if in star, whether connected to the neutral conductor or not.

It will be noted that the star-connected primary windings of my auxiliary current transformers 21, 22 and 23 provide a neutral return circuit 24 for the zero-phase-sequence currents, and that the secondary windings of these transformers are so connected as to neutralize the primary inductance for in-phase currents in all three of the auxiliary transformers. Any secondary connection which accomplishes this purpose may be utilized. Thus, in Fig. 2, the auxiliary transformers, which are marked 21ª, 22ª and 23ª, are provided with secondary windings 26 which are connected together in a closed delta circuit, and are not connected in the neutral conductor 24. The effect is the same, namely to permit in-phase currents to circulate freely in the three secondaries 26, but to prevent the circulation of the out-of-phase currents of the positive and negative phase-sequences. In this case, the auxiliary transformers 21ª, 22ª and 23ª may have any desired transformation-ratio so long as they all have the same ratio.

In Fig. 2, also, the relays, here indicated as 17ª, 18ª and 19ª, are shown more fully as impedance relays having current-responsive actuating coils 27 and voltage-responsive restraining coils 28, the latter being energized from potential transformers 29.

My invention adapts the principles of symmetrical coordinates to relays of ordinary types, and does not require the use of the so-called phase-sequence networks which segregate the phase-sequence components from the system to be protected. The auxiliary transformer means provided in the neutral connection of the main current transformers provides a very efficient method for eliminating the zero phase-sequence components from the relays.

Obvious changes may be made to my invention without departing from the spirit and scope thereof, such as the use of voltage-actuated relays and various transforming means therefor. It is to be understood, therefore, that my invention is not to be limited in its spirit and scope except as indicated in the appended claims.

I claim as my invention:

1. In combination with a polyphase circuit to be protected, a current transformer associated with each of the phase conductors thereof, the secondary windings of said transformers being star-connected and having a conductor extending from the neutral point thereof, relays respectively connected for energization from said secondary windings, and means associated with each relay and said neutral conductor for preventing zero-sequence currents from traversing said relays.

2. In combination with a polyphase circuit to be protected, a current transformer associated with each of the phase conductors thereof, the secondary windings of said transformers being star-connected and having a conductor extending from the neutral point thereof, relays respectively connected for energization from said secondary windings, and means associated with each relay and said neutral conductor for preventing zero-sequence currents from traversing said relays, said means including electrical circuits connected at one end thereof to the neutral-conductor and at the other end thereof adjacent the respective relays at points between the relays and the respective secondary transformer windings.

3. In combination with a polyphase circuit to be protected, a current transformer associated with each of the phase conductors, the secondary windings of said transformers being star-connected and having a conductor extending from the neutral point thereof, relays respectively connected for energization from said secondary windings, and means for preventing zero-sequence currents from traversing said relays, said means comprising transforming means having secondary windings associated with said neutral conductor and having primary windings connected, respectively, between said neutral-conductor and each of said relays.

4. In combination with a polyphase circuit to be protected, a current transformer associated with each of the phase conductors thereof, the secondary windings of said transformers being star-connected and having a conductor extending from the neutral point thereof, relays respectively connected for energization from said secondary windings, and means for preventing zero-sequence currents from traversing said relays, said means including a plurality of transformers having secondary windings connected in series with said neutral conductor and primary windings each having one terminal connected to said neutral conductor and the other terminals thereof associated respectively with said relays.

5. In combination with a polyphase circuit to be protected, a current transformer associated with each of the phase conductors thereof, the secondary windings of said transformers being star-connected and having a conductor extending from the neutral point thereof, relays respectively connected for energization from said secondary windings, and means for preventing zero-sequence currents from traversing said relays, said means including a plurality of transformers having secondary windings connected in series with said neutral conductor and primary windings each having one terminal connected to said neutral conductor and the other terminals thereof connected, respectively, to points between said relays and the respective secondary windings of said current transformers.

6. The combination with a three-phase line, of a set of star-connected current transformers, a set of current-responsive devices, and means whereby substantially all of the current from the current transformers is supplied to the terminals of said current-responsive devices except the zero-phase-sequence component, said means including three conductors connected between the terminals of said current-responsive devices and the respective terminals of said current transformers, and a set of three single-phase transformers each having a primary winding and a secondary winding, the primary windings being star-connected and connected in shunt across said conductors, with the neutral point of said windings connected to the neutral point of said current transformers, and the secondary windings being so connected that the in-phase zero-phase sequence currents in the three transformers will neutralize each other and produce a substantially zero total voltage-drop to the flow of said zero-phase-sequence currents.

7. The combination with a three-phase line, of a set of star connected current transformers, a set of current-responsive devices, and means whereby substantially all of the current from the current transformers is supplied to the terminals of said current-responsive devices except the zero-phase-sequence component, said means including three conductors connected between the terminals of said current-responsive devices and the respective terminals of said current transformers, and a set of three single-phase transformers each having a primary winding and a secondary winding, the primary windings being star-connected and connected in shunt across said conductors, with the neutral point of said windings connected to the neutral point of said current transformers, and the secondary windings each having one-third as many turns as its associated primary winding, said secondary windings being connected in series with the neutral connections.

8. The combination with a polyphase line, of a set of star-connected current transformers, a set of current-responsive devices, and means whereby substantially all of the current from the current transformers is supplied to the terminals of said current-responsive devices except the zero-phase-sequence component, said means including three conductors connected between the terminals of said concurrent-responsive devices and the respective terminals of said current transformers, and a set of auxiliary single-phase transformers each having a primary winding and a secondary winding, the primary windings being star-connected and connected in shunt across said conductors, with the neutral point of said windings connected to the neutral point of said current transformers, and the secondary windings being so connected that the in-phase zero-phase sequence currents in the auxiliary transformers will neutralize each other and produce a substantially zero total voltage-drop to the flow of said zero-phase-sequence currents.

9. The combination with a three-phase line, of a relay system comprising a set of impedance relays having current-responsive actuating windings and voltage-responsive restraining windings, characterized by the fact that the current windings are fed from a set of star-connected current transformers which are shunted by a set of auxiliary transformers having primary and secondary windings so connected as to be substantially non-inductive to zero-sequence currents which are of the same phase in all three phases.

10. The combination with a three-phase line, of a relay system comprising a set of impedance relays having current-responsive actuating windings and voltage-responsive restraining windings, characterized by means for energizing the current windings from a set of current conductors carrying currents made up solely of positive and negative phase-sequence components of the line current.

11. In combination with a polyphase circuit to be protected, a current transformer associated with each of the phase conductors thereof, the secondary windings of said transformers being star-connected and having a conductor extending from the neutral point thereof, relays respectively connected for energization in star from said secondary windings, and a grounding transformer connected across the terminals of said star-connected secondary windings, said grounding transformer having a neutral connection connected to the neutral-point conductor of said secondary windings.

12. In combination with a polyphase circuit to be protected, a current transformer associated with each of the phase conductors thereof, the secondary windings of said transformers being star-connected and having a conductor extending from the neutral point thereof, relays respectively connected for energization in star from said secondary windings, and a zero-sequence filter connected across the terminals of said star-connected secondary windings.

13. The combination with a three-phase line, of a set of star-connected current transformers, a set of current-responsive devices energized therefrom, and a grounding transformer connected across the terminals of said star-connected current transformers, said grounding transformer having a neutral connection connected to the neutral point of said star-connected current transformers.

14. The combination with a three-phase line, of a set of star-connected current transformers, a set of current-responsive devices energized therefrom, and a zero-sequence filter connected across the terminals of said star-connected current transformers.

15. The combination with a three-phase line, of a set of star-connected current transformers, a set of current-responsive devices, and means whereby substantially all of the current from the current transformers is supplied to the terminals of said current-responsive devices except the zero-phase-sequence component, said means including three conductors connected between the terminals of said current-responsive devices and the respective terminals of said current transformers, and a grounding transformer connected across the terminals of said star-connected current transformers, said grounding transformer having a neutral connection connected to the neutral point of said star-connected current transformers.

16. The combination with a three-phase line, of a three-phase current-responsive device and a star-connected current transformer delivering substantially all of its current except the zero-phase-sequence component to the three terminals of said current-responsive device, characterized by the fact that said current transformers are substantially short-circuited with respect to said zero-phase-sequence component by means of a zero-sequence filter.

17. The combination with a three-phase line, of a set of star-connected current transformers having three-phase terminals and a neutral point, a set of current-responsive devices having three-phase terminals, three conductors connected between the three-phase terminals of said current-responsive devices and the respective three-phase terminals of said current transformers, and a set of transformers having three-phase terminals and a neutral terminal so connected, respectively, to said conductors and to the neutral point of said star-connected current transformers, as to present substantially a short-circuit path for the zero-sequence currents and a very high impedance for positive- and negative-sequence currents.

In testimony whereof, I have hereunto subscribed my name this 28 day of May, 1930.

SHIRLEY L. GOLDSBOROUGH.